United States Patent [19]

Todd et al.

[11] Patent Number: 4,835,744

[45] Date of Patent: May 30, 1989

[54] MARINE SEISMIC DATA ACQUISITION SYSTEM AND METHOD

[75] Inventors: James D. Todd, Houston; Herbert J. Meyer, Bellaire; Albert J. Zorn, Houston, all of Tex.

[73] Assignee: Texaco Inc., White Plains, N.Y.

[21] Appl. No.: 136,614

[22] Filed: Dec. 21, 1987

[51] Int. Cl.$^4$ ............................ G01V 1/38; G01V 1/22
[52] U.S. Cl. ...................................................... 367/20
[58] Field of Search ....................... 367/13, 20, 76, 78, 367/79; 340/825.52, 825.54

[56] References Cited

U.S. PATENT DOCUMENTS 4,523,191  6/1985  Cretin et al. .................... 340/825.52
4,635,237  1/1987  Benested et al. ...................... 367/20
4,736,346  4/1988  Cretin et al. ........................... 367/20

FOREIGN PATENT DOCUMENTS 2067056  7/1981  United Kingdom .................. 367/79

Primary Examiner—Thomas H. Tarcza
Assistant Examiner—Ian J. Lobo
Attorney, Agent, or Firm—Robert A. Kulason; James J. O'Loughlin; Ronald G. Gillespie

[57] ABSTRACT

A marine seismic data acquisition system and method includes a plurality of hydrophone arrays. A marine cable is towed in the water by a boat. The marine cable includes a plurality of active modules. Each active module is connected to a corresponding hydrophone array and collects seismic data from the geophones. The marine cable also includes a plurality of passive modules interspersed with a plurality of active modules, with each passive module generating, receiving and transmitting signals. The passive modules and the active modules are connected by electrical wires with each other and to the electronic equipment on the boat. The electronic equipment on the boat includes a subsystem for activating the active modules; another subsystem for interrogating the active modules and the passive modules and circuitry connected to the activating subsystem and to the interrogation subsystem which determines the source of transmission errors in signals received over the marine cable.

14 Claims, 2 Drawing Sheets

MARINE SEISMIC DATA ACQUISITION SYSTEM AND METHOD

BACKGROUND OF THE INVENTION

Field of the Invention

The present invention relates to seismic data acquisition systems and methods in general and more particularly to marine seismic data acquisition systems and methods.

SUMMARY OF THE INVENTION

A marine seismic data acquisition system and method includes a plurality of hydrophone arrays. A marine cable is towed in the water by a boat. The marine cable includes a plurality of active modules. Each active module is connected to a corresponding hydrophone array and collects seismic data from the geophones. The marine cable also includes a plurality of passive modules interspersed with a plurality of active modules, with each passive module generating, receiving and transmitting signals. The passive modules and the active modules are connected by electrical wires with each other and to the electronic equipment on the boat. The electronic equipment on the boat includes a subsystem for activating the active modules; another subsystem for interrogating the active modules and the passive modules and circuitry connected to the activating subsystem and to the interrogation subsystem which determines the source of transmission errors in signals received over the marine cable.

The foregoing and other objects and advantages of the invention will appear more fully hereinafter from the consideration of the detailed description which follows, taken together with the accompanying drawings wherein one embodiment of the present invention is illustrated by way of example. It is to be expressly understood, however, that the drawings are for illustration purposes only and are not to be construed as defining the limits of the invention.

DESCRIPTION OF THE INVENTION

Figure 1:
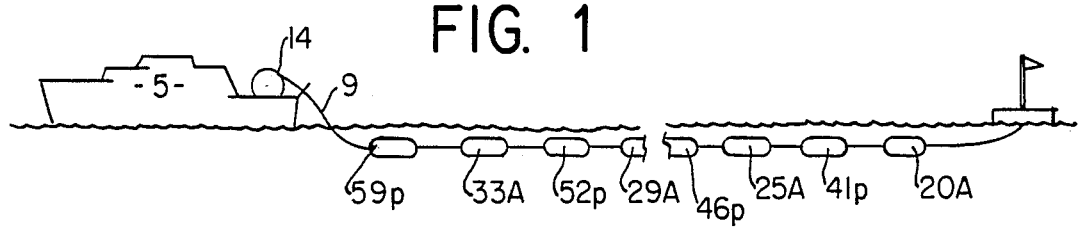
FIG. 1 is a diagrammatic representation of a boat towing a marine cable constructed in accordance with the present invention.

This present invention is a marine seismic system which:

1. locates the source of the transmission errors in the seismic digital cable system, and
2. corrects for extraction and parity errors by minimizing their effect on the seismic data.

The seismic digital cable and the electronic modules themselves, can cause among others the three following types of errors:

1. missing scans
2. missing extractions
3. parity errors.

These errors can be due to a defective transmission link and/or incorrect decoding or repetition of information by active or passive electronic modules. The location where these errors occur is difficult to determine since the conventional systems presently have little provision for this capability. The time lost in determining the location of such problems, in particular in a marine operation, can be lengthy, and thus costs are high.

The present invention calls for the modification of the present passive modules in the digital cable to keep track of the number of commands which pass through them in either direction. Any discrepancy in the count which occurs between two adjacent passive modules will indicate that the problem lies between the previous passive module to the next passive module. The passive modules can be interrogated along with the active modules at the end of the record when auxiliary information is acquired. A display may be in the form of a computer which will have programs to add some artificial intelligence to the module's interrogation.

The present invention also calls for adding a random access memory to the 'On Board Electronics' known as the telemetry processor. The random access memory holds one scan of seismic data. When an extraction error or a parity error occurs the data from the previous scan will be substituted. The data for that location will have the effect of a slower sample rate.

A marine seismic digital cable consists of both active and passive modules, which will be described in greater detail later. The modules are connected by two telemetry lines for communication purposes. One link, the send link, carries the commands from the telemetry processor on a boat out to the first module nearest to the tail buoy, and the other link, the return link, carries the commands and data back from the first module, nearest to the tail buoy, back to the boat. Each active module acquires data from 12 hydrophone groups, amplifies the data and converts the data to 12 digital words. Each word consists of 19 bits (18 bits+parity).

Passive modules are used only as telemetry repeaters to ensure a proper telemetry link where the distance between active modules is too large. Two types of commands employed are, start of scan commands (SOS) and extraction commands. An SOS will command all active modules to take a data sample. SOS commands are transmitted at the required data rate (2 millisecond rate for 2 millisecond sample rate). Extraction commands are used to address the proper active module to insert its stored data on the transmission line. Extraction commands are transmitted at a 24.4 microsecond rate. An extraction command word includes a unique address for an active module.

The transmission lines transmit both commands and data in a serial form at a rate of 10 megahertz. An SOS command is sent out from the telemetry processor through the passive and active modules to the first active module, closest to the tail buoy. On the way from the telemetry processor to the first active module, all the modules act like the passive modules, as repeaters only. On the return from the first active module to the telemetry processor, the active modules interpret the command as an SOS and each module takes a data sample. After the first SOS is sent out, each active module has 12 data words, one from each data channel, available in memory. After the second SOS, extraction commands are sent out at a rate of one every 24.5 microseconds, one for each active module. Thus the 20 active modules require 20 extraction commands to be sent out for each scan.

Each extraction command has a unique address. The first extraction command addresses the first active module. After the first module detects the extraction code, it will repeat the code and tag on to it 12 data words (19 bits each). The extraction code and 12 data words will now be (19+12*19=) 247 bits long, which corresponds to 23.5 microseconds. After 24.5 microseconds from the start of the first extraction command, a second extraction command is sent from the TP. This command has the address of the second active module. The first active module decodes the command and checks the address. Since the address does not match, it simply repeats the command. The second active module repeats the command. Since the address fits the module's address, the module tags its 12 data words after the extraction command. This procedure is repeated for each active module. When all active modules have been addressed, the transmission line becomes inactive until the next SOS.

The telemetry processor decodes the commands returning from the modules in the cable, counts the SOS and extraction commands and checks the data for parity errors. The data words are converted from serial to parallel. The data is sent to a mass storage device and then to a magnetic tape. If there is a discrepancy between the SOS commands sent, and the SOS commands received, an error is flagged. The same is true for extraction commands. Parity errors are also displayed. Conventional use of the digital marine cable cannot determine what caused an extraction error, an SOS error or a parity error.

With reference to FIG. 1, there is shown a boat 5 with a streamer cable 9 partially on a reel 14 towing active modules 20A, 25A, 29A, and 33A; and passive modules 41P, 46P, 52P, and 59P. It should be noted that the suffix A is used to identify active modules while the suffix P is used to identify passive modules. All modules having the same alpha suffixes are the same in detail. Modules 20A through 59P are connected serially in streamer cable 9 and modules 20A is also connected to a tail buoy.

Figure 2A:
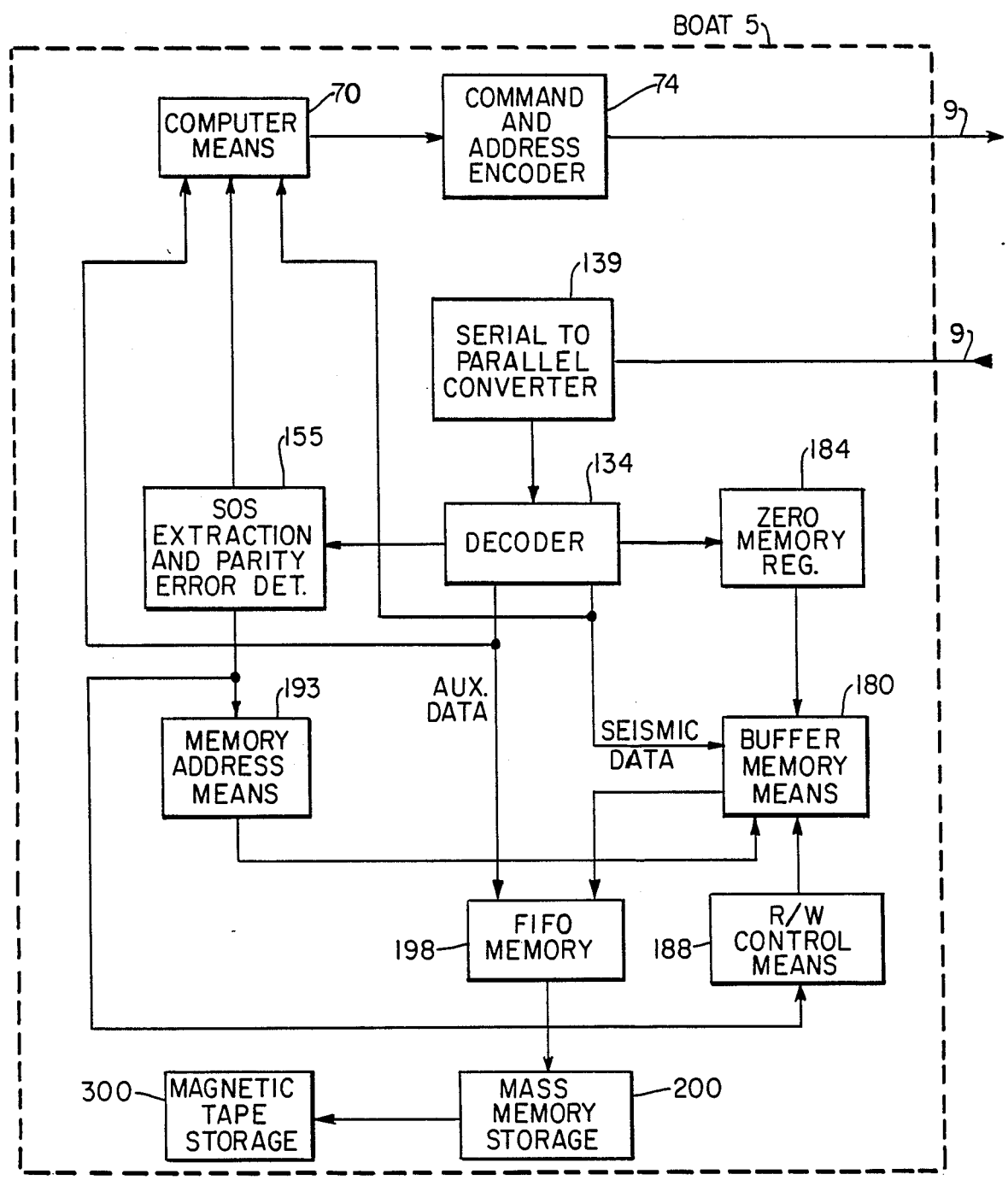
FIGS. 2A and 2B taken together form a simplified block diagram of a marine seismic data acquisition system constructed in accordance with the present invention.
Figure 2B:
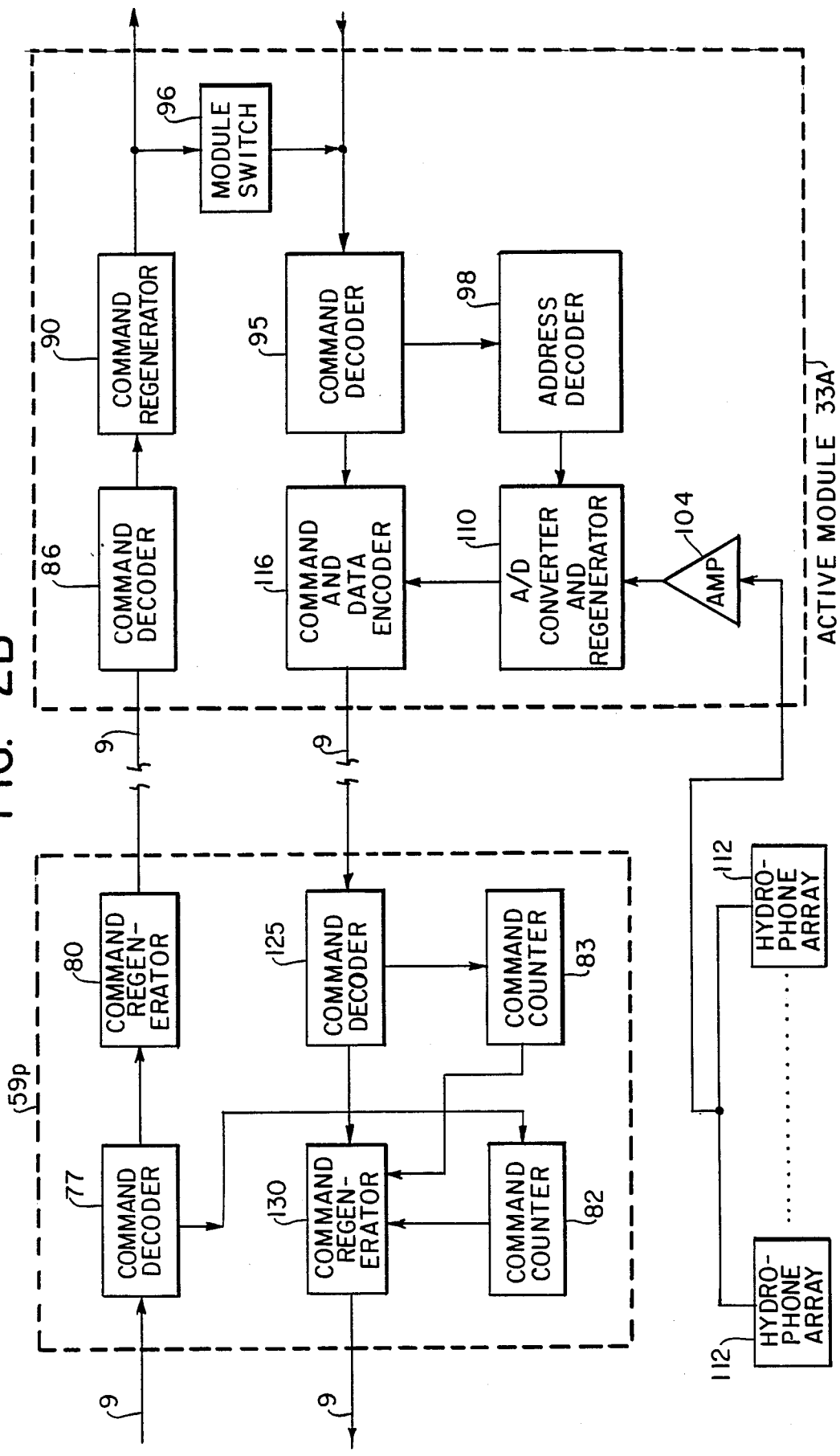

With reference to FIG. 2, boat 5 includes a computer means 70 which provides preprogrammed signals to a command and address decoder 74 which provides among others the start of scan (SOS) and the extraction commands. The signals from command and address encoder 74 are provided via cable 9 to a command decoder 77 in passive module 59P which in turn provides them to a command generator 80.

Command decoder 77 also provides a pulse to the command counter 82 when a command signal is decoded. Thus command counter 82 counts the SOS and extraction commands which pass through module 59P from boat 5 to tail buoy 64 along cable 9. Command generator 80 in essence regenerates the command signals to make up for the deterioration of the signals due to the transmission over a long distance. Command signals from command generator 80 are provided to a command decoder 86 in active module 33A which in turn provides them to another command regenerator 90 in active module 33A. It can be seen that this is the first telemetry link previously referred to. The command and address signals provided by command and address encoder 74 are provided serially along this link to all of the active and passive modules all the way to tail buoy 64, where in effect they are turned around through module switch 96, in the last module closest to the tail buoy 64, which is module 20A, and sent back through the other modules so they can start the seismic processing. Thus, active modules 20A, 25A, 29A and 33A will be interrogated in sequence, starting with module 20A and finishing with module 33A.

A portion of the return telemetry link is also shown in FIG. 2. The signals provided to command decoder 95 in active module 33A include not only command and address signals but also will now include data signals. Module 20A is the first active module on the return link in cable 9. Module 20A does not receive any data signals. Module switch 96 is closed on module 20A only since this is the module closest to tail buoy 64. Module switches 96 in the other active modules are not used. Thus on the first module command regenerator 90 is connected through first module switch 96 to command decoder 95. This provides the return pass for the outgoing commands. The signals from command decoder 95 include SOS commands and extraction command signals which are processed to address decoder 98. As noted previously, each extraction command has a unique address. When an SOS command is received, seismic data is being picked up from twelve seismic channels which are fed to an amplifier 104 where seismic signals are amplified and provided to an analog-to-digital converter 110. Each seismic channel is connected to a hydrophone array 112.

The output of the analog-to-digital converter 110 is controlled by address decoder 98. When address decoder 98 receives the proper address code, it commands the analog-to-digital converter 110 to output the amplified and digitized data to command and data encoder 116. Command and data encoder 116 adds the data signals from A/D converter 110 to the command and address data signals it receives from command decoder 95. Command and data encoder 116 provides the commands and data to decoder 125 in passive module 41P, via cable 9, which in turn provides the command address and data signals to command generator 130. Command decoder 125 also provides a pulse to counter 83 when an SOS or an extraction command is decoded. Command generator 130 provides the signals to a serial to parallel converter 139 on boat 5 via cable 9.

The serial to parallel converter 139 converts every 19 serial bits to one parallel word. A synchronization code is provided with each command word. The serial to parallel converter 139 provides the signals to decoder 134. Decoder 134 decodes the incoming commands and data. Seismic data is routed to buffer memory means 180 and to computer means 70. Auxiliary data is routed to FIFO memory 198 and to computer means 70. Commands are routed to zero memory register 184 and to SOS extraction and parity error detection 155. Buffer memory 180 which receives data from decoder 134 holds data for one scan (one sample from each data channel used). Once buffer memory 180 received all the data channels it will provide the data to FIFO register 198. FIFO register 198 provides its data to mass memory 200 which in turn provides the data to a magnetic storage device 300.

At the start of each record, during the first scan, no data is transmitted from the active modules. During the first scan buffer memory means 180 is filled with zeros from zero memory register 184. Memory address means 193 controls the orderly location of each data channel in buffer memory 180 (the data from channel one is always in the same location in memory as well as all other data channels). Read/Write control means 188 controls whether data is written into buffer memory 180, or read out of buffer memory 180. Extraction and parity error detector 155 controls read/write means 188 and memory address means 193. When an extraction error is detected by extraction and parity error detector 155, read/write control means 188 forces buffer memory means 180 into a read position. Memory address means 193 then advances by a count of 12 (which is for the 12 data channels missing due to the error). Thus when an extraction error occurs no data is written into buffer memory 180. However, the orderly storage of data channels is not altered. The same happens when a parity error is detected by SOS extraction and parity error detector 155. Buffer memory means 180 will be in a read position, memory address means 193 will advance by one (for the one channel which is missing). When all the data for a scan is acquired, read/write control means 188 forces buffer memory means 180 into a read position. Read/write control means 188 commands memory address means 193 to address buffer memory means 180 to transfer data in an orderly fashion, starting with the first channel and ending with the last channel, to FIFO register 198. From FIFO memory 198 the data is transferred to mass memory storage 200 and from there to magnetic tape storage 300.

At the end of each data acquisition cycle an auxiliary cycle occurs. During this cycle all modules are interrogated as to certain pertinent information. The command counters are also interrogated as to the command count. Module 59P command counter 82 holds the command count for the outgoing commands, and command counter 83 holds the command for the incoming commands. All the command counts are directed through (as all other auxiliary information) the serial to parallel converter 139 to decoder 134 to computer means 70. The auxiliary information is also transferred from decoder 134 to magnetic tape storage 300 through FIFO memory 198 and mass memory storage 200. Computer means 70 will display through some artificial intelligence any discrepancy in the command counters.

What is claimed is:

1. A marine seismic system comprising:
   a marine cable being towed in the water by a boat, said cable includes
   a plurality of hydrophone arrays,
   a plurality of active module means, each active module means being means connected to a corresponding hydrophone array, for collecting seismic data from the hydrophone array,
   a plurality of passive module means interspersed with the plurality of active module means, each passive module means being means for generating, receiving and transmitting signals, and
   electrical wires interconnecting the active modules and the passive modules with each other and to electronic equipment on the boat; and
   the electronic equipment on the boat includes:
   means connected to the marine cable for activating the active modules,
   interrogation means connected to the marine cable for interrogating the active modules and the passive modules,
   means connected to the activating means and to the interrogation means for determining a source of transmission error in signals received over the marine cable, and
   means connected to the interrogation means for processing collected seismic data from the interrogation means.

2. A system as described in claim 1 in which the activating means is connected to the marine cable and provides command signals; and each passive module means includes:
   first decoding means connected to the marine cable for decoding the command signals provided by the marine cable and for providing a pulse when a command signal is decoded,
   first counter means connected to the first decoding means for counting the pulses provided by the first decoding means so as to contain a count representative of the number of command signals that have been decoded by the first decoding means, and
   first regeneration means connected to the first decoder means for regenerating the command signals in accordance with the decoded command signals from the first decoding means; and
   each active module means includes:
   second decoder means connected to the marine cable for decoding the command signals provided by the marine cable, and
   second regenerating means connected to the second decoding means for regenerating the decoded command signals from the second decoding means to provide command signals to the marine cable so that there is in effect a send link consisting of the activating means, the first decoding means and the first regenerating means in each passive module and the second decoding means and the second regenerating means in each active module.

3. A seismic system as described in claim 2 in which each passive module has third decoding means connected to the marine cable for decoding the command signals provided by the marine cable and for providing a pulse when a command signal is decoded,
   second counter means connected to the third decoding means for counting the pulses provided by the third decoding means so as to contain a count representative of the number of command signals that have been decoded by the third decoding means,
   third regeneration means connected to the third decoder means for regenerating the command signals in accordance with the decoding command signals from the third decoding means; and
   each active module means includes:
   fourth decoding means connected to the marine cable, except for the active module means furthest away from the boat, for decoding the command signals provided by the marine cable, and
   regeneration and data encoder means connected to the fourth decoder means and each command and data encoder means being also connected to a corresponding group of hydrophone arrays within the plurality of hydrophone arrays for regenerating the command signals from the fourth decoder means and encoding data from the corresponding hydrophone arrays in response to a particular command signal; and
   wherein the active module means furthest away from the boat further includes:
   a module switch means for passing the regenerated command signals from the second regenerator means through the fourth decoding means and so that the return link includes the third decoding means and the third regenerating means in each passive module and the fourth decoding means and the regeneration and data encoding means in each active module and the interrogation means.

4. A system as described in claim 3 in which the regeneration and data encoder means includes:
   means for amplifying signals provided by the group of hydrophone arrays, analog to digital converter and register means connected to the amplifying means and responsive to an enter signal for converting the analog signal from the amplifying means to digital signals so as to provide digital signals corresponding to the signals from the amplifier means, address decoder means connected to the fourth decoding means and to the analog to digital converter and register means for providing an enter signal to the analog to digital converter and register means in response to an appropriate command signal decoded by the fourth decoding means, and regeneration and data encoded circuit means connected to the fourth decoding means and to the analog to digital converter and register means for regenerating the signals provided by the fourth decoding means and for entering the digital signals provided by the analog to digital converter and register means as part of the signals being returned over the return link.

5. A system as described in claim 4 in which the interrogating means includes:

fifth decoding means connected to the marine cable for decoding the signals provided by the marine cable to provide signals, start of scan, extraction and parity error detection means connected to the fifth decoding means and providing signals in accordance with the signals from the decoding means corresponding to the start of scan extraction and parity errors detection to the data processing means, buffer memory means connected to the decoding means for storing the seismic data portion of the decoded signals, zero memory means connected to the decoding means and to the buffer memory means and responsive to a signal from the fifth decoding means for causing the buffer memory means to go to zero, memory address means connected to the start of scan, extraction and parity error detection means for providing address signals to the buffer memory means in accordance with the signals from the detection means, read/write control means connected to the detection means and to the buffer memory means for controlling the buffer memory means to read or to write in accordance with the signal from the detection means, first in, first out memory means connected to the fifth decoding means and to the buffer memory means and to the data processing means, entering the signals corresponding to the counts in the first and second counter means in each of the passive modules and for entering the seismic data signals provided by the buffer memory means, and for providing those signals to the data processing means.

6. A system as described in claim 5 in which the interrogating means includes:

means for detecting command signals and data signal errors in accordance with those portions of the signals being interrogated that are representative of the count in the counter means in the passive modules.

7. A system as described in claim 6 further comprising:

means connected to the interrogation means and the processing means for substituting last valid data signals in lieu of defective data signals.

8. A marine seismic method comprising the steps of:

towing a marine cable being in the water by a boat, said cable includes providing a plurality of hydrophone arrays, locating a plurality of active module means in the marine cable, each active module means being means connected to a corresponding hydrophone array, collecting seismic data from groups of hydrophone arrays in a manner so that the seismic data of a group of hydrophone arrays are provided to a corresponding active module, receiving and transmitting signals with the active modules, locating a plurality of passive modules interspersed with the plurality of active modules, generating, receiving and transmitting signals with the passive modules, and electrically interconnecting the active modules and the passive modules with each other, activating the active modules, interrogating the active modules and the passive modules, determining a source of transmission error in signals received over the marine cable, and processing collected seismic data from the interrogation means.

9. A method as described in claim 8 in which the activating step includes:

providing command signals;

each generating, receiving and transmitting signal with passive modules step includes for each passive module:

first decoding the command signals provided by the marine cable, providing a pulse when a command signal is decoded, first counting the pulses provided by the first decoding step so as to contain a first count representative of the number of command signals that have been first decoded, first regenerating the decoded command signals in accordance with the first decoded command signals, providing the first regenerated command signals to the marine cable; and the receiving and transmitting with active modules step includes for each active module:

second decoding the command signals provided by the marine cable, and second regenerating the decoded command signals from the second decoding to provide the second regenerated command signals to the marine cable so that there is in effect a send link consisting of the activating step, the first decoding step and the first regenerating step in each passive module and the second decoding step and the second regenerating step in each active module.

10. A method as described in claim 9 in which each generating, receiving and transmitting with a passive module step includes:

third decoding command signals provided by the marine cable, providing a pulse when a command signal is decoded in the third decoding step, second counting the pulses provided in cooperation with the third decoding so as to contain a count representative of the number of command signals that have been third decoded, third regenerating command signals in accordance with the third decoded command signals, providing the third regenerated command signals to the marine cable; and each receiving and transmitting with an active module step includes:

fourth decoding command signals provided by the marine cable except for the active module furthest away from the boat, and fourth regenerating the decoded command signals from the fourth decoding, and encoding data from the corresponding group of hydrophone arrays in response to a particular command signals to provide a data signal, providing the fourth regenerated command signals and the data signal to the marine cable; and wherein receiving and transmitting step with the active module furthest away from the boat further includes:

passing the regenerated command signals from the second regenerating step with the active module furthest away from the boat for the fourth decoding step and so that the return link includes the third decoding step and the third regenerating step in each passive module and the fourth decoding step and the regeneration and data encoding step in each active module and the interrogation step.

11. A method as described in claim 10 in which each regeneration and data encoder step with an active module includes:

amplifying signals provided by the group of hydrophone arrays, converting the amplified signals to digital signals so as to provide digital signals corresponding to the amplified signals, storing the digital signals when an appropriate command signal is decoded in the fourth decoding step, and fourth regenerating the signals provided by the fourth decoding step, providing the fourth regenerated signals and the stored digital signals as part of the signals being returned over the return link.

12. A method as described in claim 11 in which the interrogating step includes:

fifth decoding of the signals provided by the marine cable to provide signals, providing signals in accordance with the signals from the fifth decoding step corresponding to the start of scan extraction and parity errors detection for the data processing step, storing the seismic data portion of the decoded signals in a buffer memory, causing the buffer memory means to go to zero at the start of a seismic scan, providing address signals to the buffer memory in accordance with the signals from the detection means, controlling the buffer memory means to read or to write in accordance with the signal from the detection means, first in, first out memory means connected to the fifth decoding means and to the buffer memory means and to the data processing means, entering the signals corresponding to the counts in the first and second counters in each of the passive modules in a first in, first out memory, entering the seismic data signals provided by the buffer memory in the first in, first out memory, and providing the first out signals for the data processing step.

13. A method as described in claim 12 in which the interrogating step includes:

detecting command signals and data signal errors in accordance with those portions of the signals being interrogated that are representative of the counts in the counters in the passive modules.

14. A method as described in claim 13 further comprising the step:

substituting last valid data signals in lieu of defective data signals in the first in, first out memory in accordance with the detecting step.

* * * * *